(12) United States Patent
Kamei

(10) Patent No.: US 7,214,126 B1
(45) Date of Patent: May 8, 2007

(54) ABRASIVE MATERIAL

(75) Inventor: Haruo Kamei, Higashi Osaka (JP)

(73) Assignee: Kamei Tekkosho Ltd. (JP)

( * ) Notice: Subject to any disclaimer, the term of this patent is extended or adjusted under 35 U.S.C. 154(b) by 24 days.

(21) Appl. No.: 09/691,017

(22) Filed: Oct. 18, 2000

(30) Foreign Application Priority Data

Jul. 17, 2000 (JP) ............................. 2000-216408

(51) Int. Cl.
*B23F 21/03* (2006.01)

(52) U.S. Cl. ...................... 451/541; 451/544; 451/526; 451/530; 451/330

(58) Field of Classification Search ................ 451/541, 451/544, 546, 526, 527–530, 330; 428/317.1, 428/317.7
See application file for complete search history.

(56) References Cited

U.S. PATENT DOCUMENTS

| | | | |
|---|---|---|---|
| 4,625,466 A * | 12/1986 | Saigusa | |
| 4,718,398 A * | 1/1988 | Hallez | |
| 4,753,838 A * | 6/1988 | Kimura et al. | 428/91 |
| 5,423,713 A | 6/1995 | Mishima | 451/36 |
| 5,495,844 A * | 3/1996 | Kitajima et al. | 125/13.01 |
| 6,146,247 A * | 11/2000 | Nokubi et al. | 451/40 |
| 6,183,347 B1 * | 2/2001 | Shaw | 451/36 |
| 6,251,002 B1 * | 6/2001 | Close | 451/544 |

FOREIGN PATENT DOCUMENTS

| EP | 0798081 | * | 3/1997 |
|---|---|---|---|
| EP | 0798081 A2 | * | 3/1997 |

OTHER PUBLICATIONS

U.S. Appl. No. 08/826,344 entitled Method and Apparatus for Grinding the Surface of a Work.

* cited by examiner

*Primary Examiner*—Lee D. Wilson
*Assistant Examiner*—Anthony Ojini
(74) *Attorney, Agent, or Firm*—Thompson Hine LLP

(57) ABSTRACT

A flexible layer is formed on a surface of a core, and a polishing layer mixed with abrasive particles is formed on a top of the flexible layer. The flexible layer is produced by applying an emulsion adhesive as a flexible layer onto a core and attaching abrasive particles onto the flexible layer, or by applying an emulsion adhesive mixed with abrasive particles onto a core. The flexible layer is then subjected to a heating and drying process. Thus obtained is an abrasive material which is easy to produce, needs no rigorous criteria in the selection of a core, and imparts, to a binder of abrasive particles, flexibility, conventionally required of the core, at no expense of surface finishing performance.

17 Claims, 2 Drawing Sheets

ABRASIVE MATERIAL

BACKGROUND OF THE INVENTION

1. Feild of the Invention

The present invention relates to an abrasive material for use in the surface finishing process of a variety of works including a metal, a ceramic, a plastic or a composite material of some of these, and in particular, to an abrasive material for use in the surface finishing process of a work having a complicated irregular contour.

2. Description of the Related Art

Conventional arts are disclosed in U.S. patent application Ser. No. 08/826,344 and Japanese Patent No. 2957492. In both prior arts, an abrasive material is constructed with attaching abrasive particles to the surface of a core. The material of the core or the abrasive particles is appropriately modified to be applied for the surface finishing of a variety of works, and performs the surface finishing on a surface of the work even if it has an irregular contour.

The conventional abrasive material has the following drawback. To finish the surface of a work, the abrasive particles need to be selected in view of the material of the work. The core itself also needs to be selected from among appropriate materials. In the surface finishing method using the abrasive material, a number of abrasive materials are sprayed to the surface of a work at a slant angle as to the surface, thereby sliding on the work surface and polishing the affected area of the surface. To assure a distance of travel of the abrasive material, the core needs to be flexible. If the hardness of the core is requested more, flexibility is further required of the core.

A good binder, for causing the abrasive particles to adhere to the surface of the core, in terms of adherence density and workability, is not always available, and the binder currently has still room for improvements.

SUMMARY OF THE INVENTION

The present invention has been developed in view of the above problems, and it is an object of the present invention to provide an abrasive material which is easy to produce, needs no rigorous criteria in the selection of a core, and imparts, to a binder of abrasive particles, flexibility, conventionally required of the core, at no expense of surface finishing performance.

To achieve the above object, the present invention employs a layer, having a flexibility, on the surface of a core. Abrasive particles are then attached to the flexible layer, forming an abrasive layer. The abrasive material with the abrasive particles thereof grinds, polishes, buffs, and performs a mirror finishing on, the surface of a work. The abrasive material is sprayed onto the work surface at a slant angle with respect to the work surface. The flexible layer absorbs impact when the abrasive material strikes the work surface, thereby allowing the abrasive material to slide on the work surface.

In view of the property of the abrasive material of the present invention for polishing, a hard material, such as a metal or a ceramic is preferably avoided as the material of the core. However, the core material is not limited to any particular one. It is important that the core has a polishing effect. The core is preferably formed of porous synthetic foamed resin. This is because impact absorbing and repellant properties prevent the work surface from being excessively ground in a finishing step.

It is not a requirement that the flexible layer and the polishing layer are two distinctly delineated layers. For instance, the flexible layer may be mixed with the abrasive particles with no clear interface present between two layers.

The material of the core is preferably suitable for recycling. The abrasive particles are inevitably come off from the core when it impacts the work at a slant angle with respect to the core surface. Although the abrasive material of this invention is based on the assumption that abrasive particles are re-attached to the core when it is recycled, the use of multiple polishing layers allows the abrasive material to be used at least several times consecutively. The number of steps required to re-attach abrasive particles is reduced. "Multiple polishing layers" can define at least two polishing layers, and the flexible layer may have a multi-layer structure. For instance, a layer structure of the surface of a core, a flexible layer, a polishing layer, a flexible layer and a polishing layer falls within the scope of the multi-layer structure of the present invention.

Besides the impact absorbing property, the above-discussed flexible layer preferably has a function of allowing the abrasive particles to adhere thereto. In accordance with the present invention, the flexible layer is produced by subjecting an emulsion adhesive to a heating and drying process. The emulsion adhesive is appropriate in that it has proper flexibility and structural strength subsequent to setting. When abrasive particles are applied through a barrel polishing method, a good efficiency in an attaching step is assured because the internal surface of a drum is free from sticking by abrasive particles because of a low viscosity of the adhesive.

The flexible layer is produced in one of two methods. In a first method, an emulsion adhesive as a flexible layer is applied onto a core, and abrasive particles are then attached to the flexible layer. The flexible layer is then subjected to a heating and drying process. In a second method, an emulsion adhesive as a flexible layer, beforehand mixed with abrasive particles, is applied to a core, and the flexible layer is then subjected to a heating and drying process.

DESCRIPTION OF THE PREFERRED EMBODIMENTS

Figure 1:
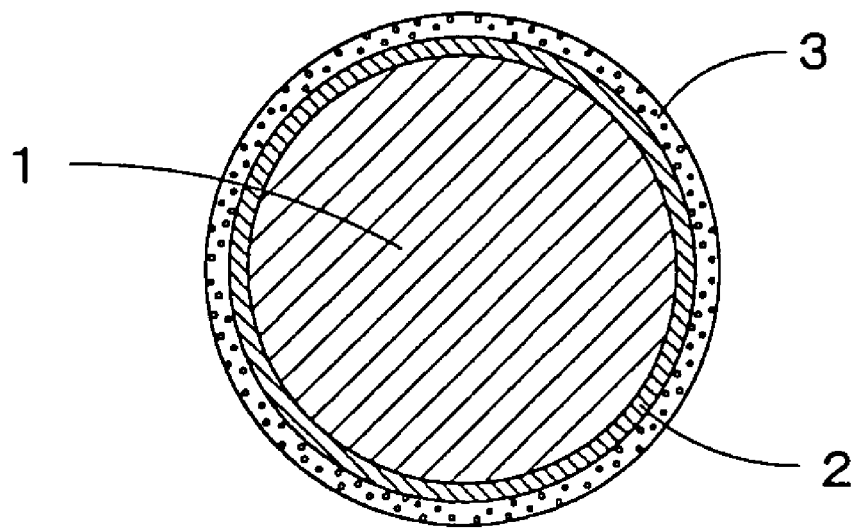
FIG. 1 is a diagram illustrating the concept of an abrasive material of the present invention.
Figure 3:
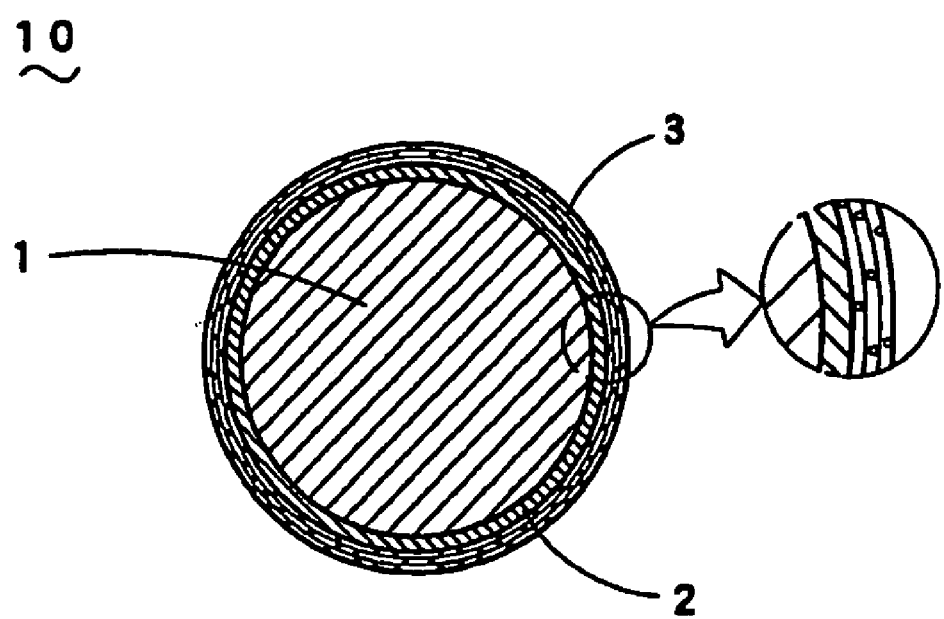
FIG. 3 is a diagram illustrating another embodiment of an abrasive material of the present invention.

Referring to the drawings, the embodiment of the present invention is discussed. FIG. 1 illustrates the concept of an abrasive material 10 of the present invention. A flexible layer 2 is formed on the surface of a core 1, and a polishing layer is formed on a top of the flexible layer 2. FIG. 3 illustrates another embodiment of an abrasive material 10 of the present invention wherein the polishing layer 3 comprises multiple layers.

The core 1 serves as a core of the abrasive material 10. In this embodiment, a porous material having elasticity, such as a synthetic foamed resin material, is cut into a core with its size ranging 50μ to 5 mm. The material of the core is not limited to any particular one and any ordinary material may be used for the core. Specifically, the core is not limited to the synthetic foamed resin. The material of the core may be a synthetic material such as rubber, or a natural substance such as corn. Since a smaller core is subject to a smaller impact energy when it impacts a work, the polishing layer 3 is hard to come off from the core 1. But any particular limitation is set on the size of the core. A soft core having a low specific gravity is appropriate for mirror finishing, while a hard core having a large specific gravity is appropriate for grinding. Depending on applications, the core needs to be modified. The flexible layer 2 must be fabricated of a material having flexibility. Flexibility, which is conventionally required of the core, is now provided by the flexible layer 2. When the abrasive material is directed to the surface of a work at a slant angle with respect to the work surface, the flexible layer 2 absorbs the impact caused, and assures sliding of the abrasive material. The work is thus polished on the area thereof where the abrasive material slides.

The polishing layer 3 is fabricated of abrasive particles, and has the function of actually polishing the work surface. An appropriate material is selected for the abrasive particles, taking into consideration the work surface, in a similar manner as in the conventional art.

The polishing layer 3 is formed by applying an adhesive onto the flexible layer 2 and attaching abrasive particles to the adhesive. Alternatively, the flexible layer 2 itself may be fabricated of an adhesive. Specifically, an emulsion adhesive is applied to the surface of the core 1, the abrasive particles are attached to the emulsion adhesive, and the emulsion adhesive is subjected to a heating and drying process. The adhesive becomes the flexible layer 2 having flexibility. The use of the adhesive as the flexible layer advantageously provides the adherence of the abrasive particles and the impact absorbing effect through flexibility. Because of its low viscosity, the adhesive is easy to work with, and further is nontoxic.

Mixing the adhesive with the abrasive particles concurrently produces the flexible layer 2 and the polishing layer 3. The method of forming the flexible layer 2 and the polishing layer 3 as separate layers and the method of forming the flexible layer 2 and the polishing layer 3 in a mixed layer fall within the scope of the present invention.

The emulsion adhesives may be of polyvinyl acetate resin, EVA resin, acrylic resin, synthetic rubber latex, and other resin. According to the tests conducted by the inventors of this invention, a synthetic rubber latex adhesive outperforms the other adhesives in adherence, flexibility, and ease of handling. The synthetic rubber latex adhesive is here an emulsion latex adhesive. The adhesive used in this invention is not limited to the emulsion latex adhesive, and alternatively, the use of emulsion of any of polyvinyl acetate resin, EVA resin, acrylic resin, and synthetic rubber latex falls within the scope of the present invention.

Each of the flexible layer 2 and the polishing layer 3 is not limited to a single layer. Alternatively, multiple layers may be employed. If each of the flexible layer 2 and the polishing layer 3 is a single layer, the abrasive particles need to be attached to at least the polishing layer 3, from which abrasive particles are come off, each time the abrasive material is used. The use of a multiple layer structure permits the abrasive material to be consecutively used several times. The abrasive material is thus continuously used for a continuous polishing operation. A multiple layer structure is produced through not only a method in which the formation of a flexible layer, the application of an adhesive, and the attachment of abrasive particles are repeated but also a method in which the mixing of an emulsion adhesive with abrasive particles, the attachment of the emulsion adhesive to the surface of a core, and the heating and drying process of the mixture.

Figure 2:
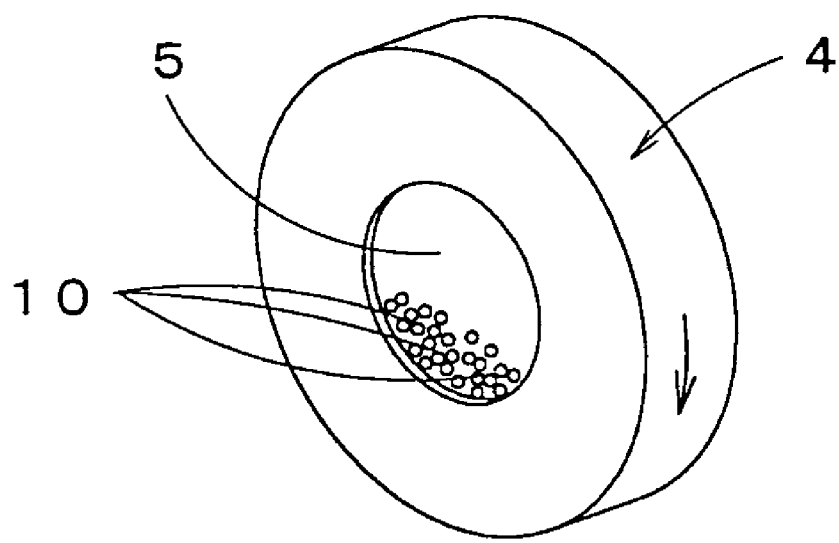
FIG. 2 illustrates a method of recycling the abrasive material.

FIG. 2 illustrates a barrel polishing method of recycling the polishing layer 3 by attaching abrasive particles to a used abrasive material, in which a drum 4 is used. A used abrasive material 10 is introduced into the drum 4 having an opening 5 on one side. The adhesive is then applied into the drum 4. The drum 4 is left rotating for an appropriate period of time to allow the adhesive to distribute among the abrasive materials 10. When the adhesive is evenly distributed among the abrasive materials 10, the abrasive particles are introduced into the drum 4 to allow the abrasive particles to adhere to the abrasive material 10. The production of the abrasive material 10 is completed by drying the adhesive in a dryer. However, if an adhesive is introduced prior to the introduction of the abrasive particles and is subjected to a drying process for fixation, the bonding strength of the abrasive particles is increased.

In accordance with the present invention, the flexible layer is arranged between the core and the polishing layer, the flexibility in the selection of the core is increased, and the abrasive material is thus easily manufactured. Since the dried emulsion adhesive is employed as the flexible layer, the impact absorbing property and the adherence of the abrasive particles are obtained with a simple construction.

What is claimed is:

1. An abrasive material for spray application to a surface of a work comprising a core and a polishing layer, wherein said polishing layer comprises a flexible layer formed on the surface of the core and abrasive particles, wherein said core is granular and made of a synthetic foam resin having elasticity, and said abrasive material is in the form of granules.

2. An abrasive material according to claim 1 wherein said flexible layer contains abrasive particles.

3. An abrasive material according to claim 2 wherein said polishing layer comprises multiple layers.

4. An abrasive material according to claim 2 wherein said flexible layer comprises an emulsion adhesive, the abrasive particles are attached onto the emulsion adhesive and the emulsion adhesive is subjected to a heating and drying process.

5. An abrasive material according to claim 1 wherein said polishing layer comprises multiple layers.

6. An abrasive material according to claim 5 wherein said polishing layer comprising an emulsion adhesive mixed with abrasive particles is applied to the core and then subjected to a heat and drying process.

7. An abrasive material according to claim 1 wherein said flexible layer comprises an emulsion adhesive, the abrasive particles are attached onto the emulsion adhesive and the emulsion adhesive is subjected to a heating and drying process.

8. An abrasive material according to claim 7 wherein said emulsion adhesive is selected from the group consisting of polyvinyl acetate resin, EVA resin, acrylic resin and synthetic rubber latex.

9. An abrasive material according to claim 7 wherein said core ranges in size from 50 microns to 5 millimeters.

10. An abrasive material according to claim 1 wherein said polishing layer comprising an emulsion adhesive mixed with abrasive particles is applied to the core and then subjected to a heat and drying process.

11. An abrasive material according to claim 1 wherein said core ranges in size from about 50 microns to 5 millimeters.

12. An abrasive material according to claim 1 wherein said synthetic foam resin is porous.

13. An abrasive material for spray application in a surface finishing process, said abrasive material comprising a plurality of granules, said granules comprising an internal core and an external polishing layer, wherein said polishing layer comprises a flexible layer and abrasive particles, said flexible layer substantially surrounding said internal core.

14. An abrasive material according to claim 13 wherein said core is made of a porous synthetic foam resin.

15. An abrasive material according to claim 14 wherein said core ranges in size from about 50 microns to 5 millimeters.

16. An abrasive material according to claim 15 wherein said flexible layer comprises an emulsion adhesive.

17. An abrasive material according to claim 16 wherein said emulsion adhesive is selected from the group consisting of polyvinyl acetate resin, EVA resin, acrylic resin, and synthetic rubber latex.

* * * * *